May 22, 1956 C. A. PARKER ET AL 2,746,381
TYPE BAR CONTROL MECHANISM

Original Filed June 14, 1949 7 Sheets-Sheet 1

INVENTORS.
CHARLES A. PARKER &
CLIFTON K. RAINEY
By
Dawson & Ones
ATTORNEYS

May 22, 1956  C. A. PARKER ET AL  2,746,381
TYPE BAR CONTROL MECHANISM
Original Filed June 14, 1949  7 Sheets-Sheet 3

INVENTORS
CHARLES A. PARKER &
CLIFTON K. RAINEY
BY Fidler, Crouse & Beardsley
ATTORNEYS May 22, 1956 — C. A. PARKER ET AL — 2,746,381
TYPE BAR CONTROL MECHANISM
Original Filed June 14, 1949 — 7 Sheets-Sheet 5

INVENTORS.
CHARLES A. PARKER &
CLIFTON K. RAINEY
BY Dawson + Ooms
ATTORNEYS

May 22, 1956 C. A. PARKER ET AL 2,746,381
TYPE BAR CONTROL MECHANISM

Original Filed June 14, 1949 7 Sheets-Sheet 6

INVENTORS
CHARLES A. PARKER &
CLIFTON K. RAINEY

BY *Fidler, Crouse & Beardsley*

ATTORNEYS

United States Patent Office 2,746,381
Patented May 22, 1956

2,746,381
TYPE BAR CONTROL MECHANISM

Charles A. Parker, Chicago, Ill., and Clifton K. Rainey, Knoxville, Tenn., assignors, by mesne assignments, to Burroughs Corporation, a corporation of Michigan Original application June 14, 1949, Serial No. 99,081. Divided and this application February 23, 1952, Serial No. 272,975

6 Claims. (Cl. 101—94)

This invention relates to accounting machines. It provides a single machine operative under selective control to function as either a typing machine, a posting machine, or a calculating machine, in which all typing and all calculator indexing operations are governed from a common, single keyboard. Incidental to the performance of its various functions, the machine embodies the usual manual and automatic controls of known typewriting, posting, and calculating machines; and additionally includes novel manual as well as automatic controls for conditioning the machine, at the will of an operator, either to carry out or to exclude, during the performance of one of its functions, the performance of all or part of its other functions. This application is a division of our copending application Ser. No. 99,081 filed June 14, 1949.

An object of this invention is to provide improvements in and related to the invention disclosed in said application.

Another object is to provide in an accounting machine having type carriers movable into and out of a hammer striking position, means for aligning the type carriers to receive the hammer strike simultaneously in their printing position.

A further object is to provide in an accounting machine having adding type carriers movable into and out of printing position and a single hammer common to a plurality of the carriers, means for holding out of printing position all adding type carriers to the left of those comprising an item to be printed.

A still further object is to produce an accounting machine of the type described embodying mechanism for preventing movement of type bars to the left of those shifted to printing position while releasing all type bars to the right for movement to at least zero printing position.

These and other objects and advantages of this invention will hereinafter appear and for purposes of illustration, but not of limitation, an embodiment is shown in the accompanying drawings, in which—

Figure 1:
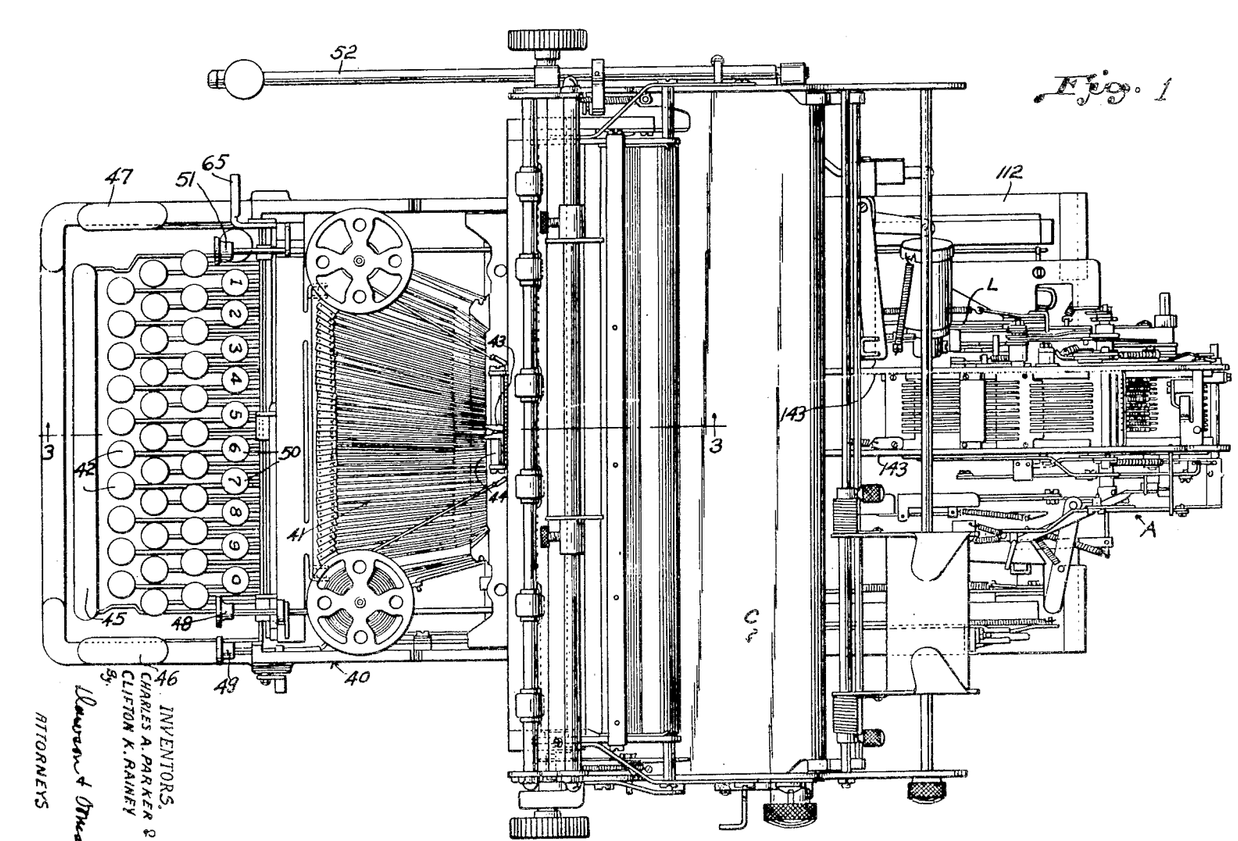
Figure 1 is a top plan view of the machine.
Figure 2:
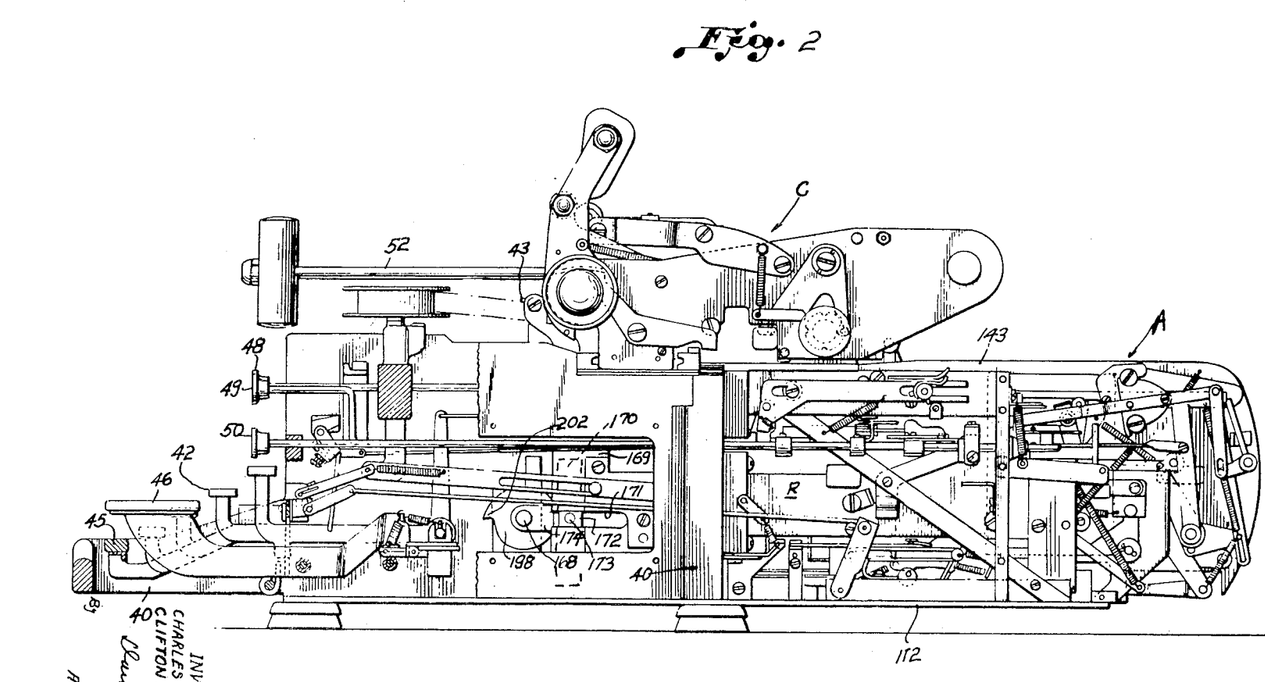
Figure 2 is a side elevation with the front part of the main frame removed for illustration of detail.
Figure 3:
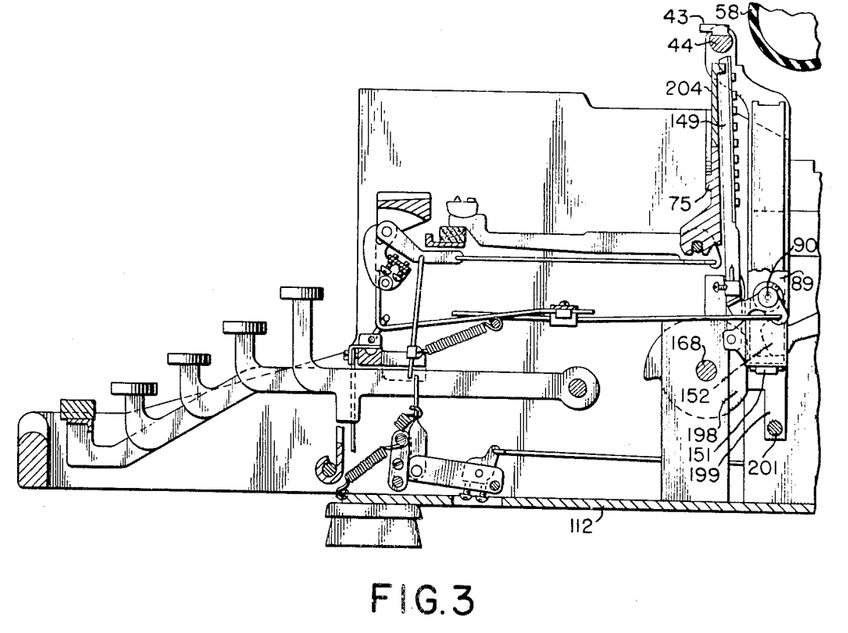
Figure 3 is a vertical section taken substantially on the line 3—3 of Figure 1.

As indicated generally in Figures 1 and 2, the apparatus essentially comprises a main frame 40 of the general form and structure of a typewriter frame, being provided with a keyboard and having a carriage assembly C mounted on the frame for reciprocation in the usual manner of typewriter and posting machine carriage operation.

The machine is equipped with a bank of front strike type bars 41 operated from keys 42 for front strike visible printing at a point determined by a type guide 43 which forms part of a hammer member 44 that operates in a manner later described to effect a common striking movement against a properly positioned series of adding type bars when they are disposed for printing. The keyboard has the usual spacer 45 and, at the right hand side of the frame, a motor bar 46. On the left hand side of the frame is disposed a tabulator bar 47. The front plate of the frame mounts keys for controlling the functions of calculating mechanism generally indicated at A. These keys at the right hand side of the frame comprise an adding key 48, a total key 49, a subtotal key 50 (Fig. 2) and, at the left hand side of the frame, a subtract key 51. The type guide 43 establishes the printing point and establishes also the decimal point for item printing in the calculating machine operation. The carriage is provided at its left hand end with a forwardly directed return handle 52 which is substantially of conventional design and which may be rotated to effect line spacing in the usual manner of such devices.

A highly important aspect of the present invention is its selective operation under the influence of a function control lever 65 mounted at the left hand side of the frame in advance of the front face plate for manipulation by an operator. This function control lever 65 is adapted for movement to any of three control positions. In its uppermost position it conditions the machine for operation as an adding machine. In its second, or intermediate, position the machine is conditioned to function as a posting machine. In its lowermost position the machine is conditioned for straight typing operation.

Incidental to the operation of the apparatus in its calculating machine function, means is provided to prevent printing of ciphers to the left of items printed from the adding type bars.

An essential part of the machine is embodied in a driven reciprocable element which operates through a defined cycle between limit positions in one of which it is at rest, under the influence of motor means to accomplish many functions and to effect the positioning and actuation of the various members and instrumentalities by which the different operation of the associated mechanisms are carried out. This member, herein referred to as an operating frame generally designated at O, provides for the actuation of the various instrumentalities after the machine has been conditioned for their proper sequential operation. It is an important aspect of this invention that, for the greater part, the operation of the various levers, detents, and actuators is under the influence of springs, whereby the various elements are biased or urged into operating movement that is normally restrained by the withholding action of other elements movable under the influence of the operating frame to permit operation of the various levers, detents, and actuators under the influence of their springs. This relieves the motor of a very considerable load, and not only assures fast, smooth operation of the machine but also eliminates to a major extent any possibility of breakage in the event of jamming. Should something occur to jam any parts of the mechanism, the affected parts will not be moved under a force greater than that exerted by their associated springs.

*Printing control from calculating unit*

The calculating unit, generally indicated as at A in

Figure 1, embodies a plurality of conventional calculator actuators, here shown as slides 142, one for each digit of the calculating unit, which reciprocate horizontally in a frame structure 143 that extends rearwardly from the rear end of the main frame 40 on the base plate 112. The frame 143 is so positioned relative to the general assembly that the printing point at the type guide 43 is disposed substantially between the second and third digits of the adding type bar assembly.

Each actuator of the calculating unit is provided with an abutment 144 positioned rearwardly of the stop pin box assembly for engagement by one of the stop pins 132', when positioned, so that forward movement of the actuator is arrested at the proper point determined by the numeral key. Common in the operation of adding machines generally, the zeros of the adding type bars all are brought to striking position at the start of a printing operation. In the machine of this invention the adding type bars are held against movement to striking position until the calculator actuators have moved beyond their zero position. Because of the fact that in the present machine a plurality of adding type bars are struck simultaneously by a hammer common thereto, means is necessary to prevent printing of zeros to the left of items printed by impact of the hammer. In machines in which the adding type bars are struck by individual hammers the withholding of type bars to the left is not necessary because those bars are not struck except when the appropriate hammer is actuated.

The machine incorporates in its stop pin box assembly the usual slide plate 145 between the stops 144 and shoulders 146 on the calculator slides. It is activated in the conventional manner from the stop box which pivots the slide.

A highly important feature of the invention is the flexible control of the adding type bar action from actuators of the calculating unit. At the start of a printing operation, the actuators move through a part of their travel independently of any operation of the adding type bars. At a predetermined point in the line of travel those actuators permitted to move beyond zero position engage and release spring biased latch means normally holding the adding type bars anchored against movement to striking position. This release is effective only as to the type bars associated with those calculator actuators which have moved beyond their zero position. All others are held against movement except the type bars to the right of any actuator that has gone beyond zero position. Actual movement of the released type bars to striking position is effected by means movable in response to a bias derived from movement of the operating frame.

Movement of the calculator actuators derives from that of the operating frame and is initiated through a spring bias that becomes effective upon the release of restraining means. The restraining means, herein embodied in an actuator restore bar, later described, is movable to release position by propulsion from the operating frame at a predetermined point in one direction of its travel. Propulsion of the restraining means acts against the tension of spring means biasing the restraining means to operative position. The bias of the spring means which urges the restraining means to operative position is utilized to return the adding type bars from printing position during movement of the operating frame in an opposite direction, jointly with restoration of the calculator actuators to initial position. The restraining means in moving back to its operative position acts through the calculator actuators to return the adding type bars toward their initial latched position. Modulating means operative from the restraining means acts at the same time on the type bar moving means to accelerate the movement of the adding type bars relative to that of the calculator actuators so that, when the operating frame comes to rest, the calculator actuators will be out of engagement with the adding type bar moving means, and the type bar moving means will again be latched to hold the type bars at the extreme limit of their travel out of printing position.

Each adding type bar comprises a shank 149 that is vertically slidable for reciprocation in the adding type bar frame 89, which includes a front plate and rearwardly extended side plates 150. Within the adding type bar frame there are disposed a plurality of followers 151 each of which receives in camming engagement the forward disk-shaped terminal 152 of its associated moving means 153, here shown as a bell crank actuator. One such actuator is provided for each adding type bar. It comprises a bell crank lever having a relatively long forward arm 154 and a shorter rear arm 155. The respective bell crank actuators 153 are pivotally supported from a shaft 156 that is mounted transversely in the frame 143. The arrangement of bell crank actuators, adding type bars, and followers, is substantially that as shown in patent of Clifton K. Rainey, No. 2,496,357 of February 7, 1950. The function of each bell crank actuator 153 is to shift its adding type bar 149 into and out of platen striking position. Normally, during index operation of the numeral keys, all adding type bars are in their lowermost position with their bell crank actuators 153 latched in the position indicated in Figure 4. In this position of the parts the lift arms 154 of the actuators 153 are all held down by a transverse yoke 157 that straddles the upper edges of the crank lever arms. At each end the yoke 157 has fixed connection with a substantially triangular plate 158 that is pivoted at its apex portion on the shaft 156. The plates 158 with the attached holding down yoke are urged to move in a clockwise direction through the agency of a pull rod 159 that is pivotally connected at its forward end to the lower end portion of the triangular plate and which at its rear end has axially slidable connection with an element of the restore bar 160. The rear ends of the rods 159 extend rearwardly beyond the restore bar and are provided with take-up adjusting means comprising nuts 161 threaded on the ends of each bar and bearing against a spacer sleeve 162 that contacts the restore bar, so that rearward movement of the bar 160 is transmitted to the pull rods 159 for pull down movement of the plates 158 and hold down yoke 157. The triangular-shaped plates 158 are normally urged to move counterclockwise through the medium of a light spring that is connected to one of the plates 158 and to a finger bracket mounted in an element of the main frame.

After the adding type bars have been indexed by operation of the numeral keys, as previously described, the items provided by the indexing are ready for printing. This printing operation is accomplished during the cycling operation of a member mounted for reciprocation in the main frame and which transmits the necessary operating movement to the parts. This member, which is the operating frame O, consists of parallel side plates forming a right hand side plate R and a left hand side plate L which are spaced apart and connected as a rigid unit by a transversely extended front bar 165 and a transversely extended rear bar 166. This frame is reciprocated horizontally in the main frame between its limit positions in a cycling operation under the influence of an electric motor with clutch mechanism. The motor and clutch assembly is secured to the main frame preferably on the left hand side thereof, and when the motor is actuated by depression of the keyboard motor bar 46 it functions to impart rotation to a main drive shaft 168 that is journalled transversely of the main frame between the sides thereof. The drive shaft 168 is rotated in a clockwise direction with respect to Figure 4. The side plates of the operating frame O are provided with forward end extensions to which are secured, on their inner faces, vertically disposed heads 169 each of which is formed with a vertical closed end slot 170. This slot is intersected intermediate its ends by a horizontal slot 171 that is closed at its rear end and open at its forward end into the vertical slot. The vertical slot constitutes a guideway for a cross head 172 which mounts a laterally extending stud 173 connected to a crank 147 secured to and rotatable with the driving shaft 168. As the main shaft 168 is rotated, the crank 174 through its cross head 172 acts to move the operating frame O horizontally forward relative to the front of the machine through one half its operating cycle, and to move the frame horizontally rearward through the other half of its operating cycle.

Figure 4:
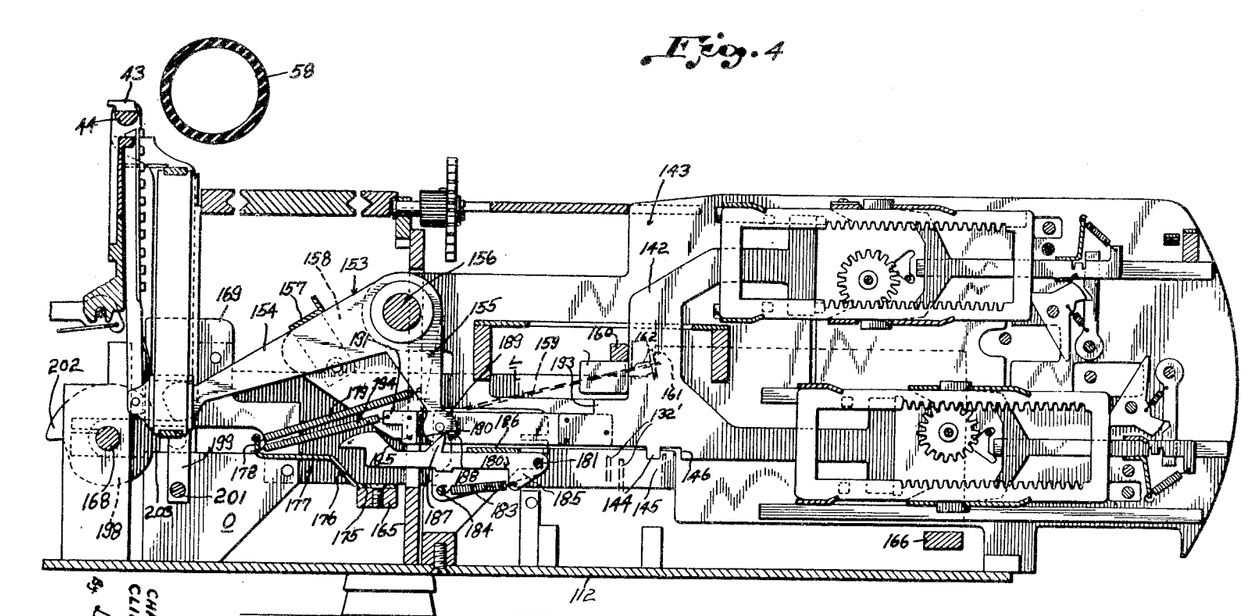
Figure 4 is a vertical section substantially through the calculating and printing unit.

With the parts in the position illustrated in Figure 4, the operating frame O is at its rearmost limit and is in position for the initiation of an operating cycle. The front cross bar 165 of the frame has secured thereto a forwardly projected plate 175 that has a portion 176 inclined upwardly and forwardly to merge with a forwardly and horizontally directed lip 177 which at its forward end is formed with an integral upstanding ear 178. A separate retracting spring is connected between the ear 178 and the short arm 155 of each bell crank actuator 153. The bias of this spring is such that as the operating frame moves forwardly during the first half of its cycle the spring is tensioned to bias the actuator 153 for rotation on its pivot in a direction clockwise with respect to Figure 4. Rocking movement of the bell crank actuator for each adding type bar is normally prevented by latch means 180. In this embodiment of the invention this latch means comprises, for each adding type bar actuator 153, a thin planar finger that is flat in a vertical plane and which underlies its associated actuator 153 in vertical registry therewith. Each finger 180 is pivotally mounted at its rear end on a bearing shaft 181 that is supported at each end in a mounting bracket 182 which is in turn fixed to the adjacent side plate of the calculating unit frame 143. The shaft 181 extends transversely between the sides of the frame 143 and occupies a position slightly forward of the rear edge of the bracket 182. Each finger normally is urged upwardly to rock clockwise on its pivot, with respect to Figure 4, through the bias of a spring 183 that is connected at one end to a transverse mounting bar 184 extending between and positioned in the brackets 182 beneath the bank of fingers. Each spring 183 at its other and rear end is connected to an ear 185 that depends from the rear end portion of its finger 180. Upward rocking movement of each finger has a limit position that is determined by the engagement of its flat upper edge against the bottom of a thin horizontal plate 186 that overrides the bank of fingers and which is secured at its ends in the brackets 182. Forwardly of the plate 186, which functions as a stop member, each finger 180 carries an upstanding detent 187 that is substantially triangular-shaped to provide an apex portion engageable in a complemental receiving socket 188 formed in the periphery of a disk-like cam head 189 on the lower end of the short arm 155 of the bell crank actuator. The apex portion of the detent 187 is inclined slightly rearwardly so that it functions, when engaged in the socket 188 of the bell crank actuator, as a positive latch which holds the bell crank actuator against movement on its pivot shaft 156. As best shown in Figure 4, in this normal position of the parts the head 189 of the bell crank actuator arm 155 is disposed slightly to the rear of a vertical shoulder 190 constituting the rear vertical edge of an insert 191 that is secured between the front ends of a pair of horizontally extended parallel side pieces 192 which, at their rear ends, are secured to the opposite side faces of a forward extension 193 of the associated calculator actuator slide 142. The side members 192 provide between them a guideway for the disk-shaped head 189 of the bell crank actuator arm 155, so that there is no possibility of side sway during the operation of the bell crank actuator. These side members also provide a guide which confines movement of the finger detent 187 to a true vertical plane for cooperation with the actuator head 189.

The insert 191 at the front end of the side members 192 is provided with a forwardly directed ear to which is attached one end of a coil retracting spring 194 that is connected at its outer and forward end to the upstanding ear 178 of the plate 175 fixed to the front bar 165 of the reciprocable operating frame O. Normally, prior to the start of a cycling operation, the springs 179 and 194 are only slightly under tension. As the operating frame moves forwardly through the first half of its cycle these springs are placed under increasing tension. The tension on the springs 194 acts to pull forwardly, in the case of each spring, its associated calculator slide 142 until forward movement of the slide is arrested by the holding action of any of the different instrumentalities which may come into play to arrest forward movement of the slide at a proper point. One such arresting means may be a stop pin 132' set in the stop pin box by operation of the indexing means. Another such arresting means may be that which is inherent to the operation of the slides in connection with their associated rack mechanisms forming a part of the calculator mechanism.

When any calculator slide 142 is arrested during the course of its forward movement the continued independent forward movement of the operating frame then increases the tension on the associated spring 194 until the operating frame has reached the forward limit of its travel. In the case of those slides permitted movement beyond zero position by any of the different types of arresting means, that is, slides which function in the operation of printing an item, forward movement will continue under the pull of the springs 194 until the leading bottom edge of the appropriate insert 191 rides upon and cams downwardly the inclined upper edge 195 of an upstanding head 196 on the front end of each finger 180. As the camming action continues, the appropriate finger 180 will be depressed sufficiently to disengage its detent 187 from the associated socket 188 of the adding type bar actuator 153, whereupon, under the tension of the spring 179, the actuator will be rocked on its pivot to move the head 189 of its short arm 155 into contact with the rear vertical edge of the insert 191. Forward movement of the slide under the influence of its associated spring 194 continues to the point at which the movement of the slide is arrested by any of the arresting means previously described. When in finally arrested position, the slide is so desposed that its paired actuator 153 will have been rotated sufficiently on its pivotal support to elevate the cam head 152 of its long arm 154 to lift its associated adding type bar to its striking elevation for printing.

Figure 5:
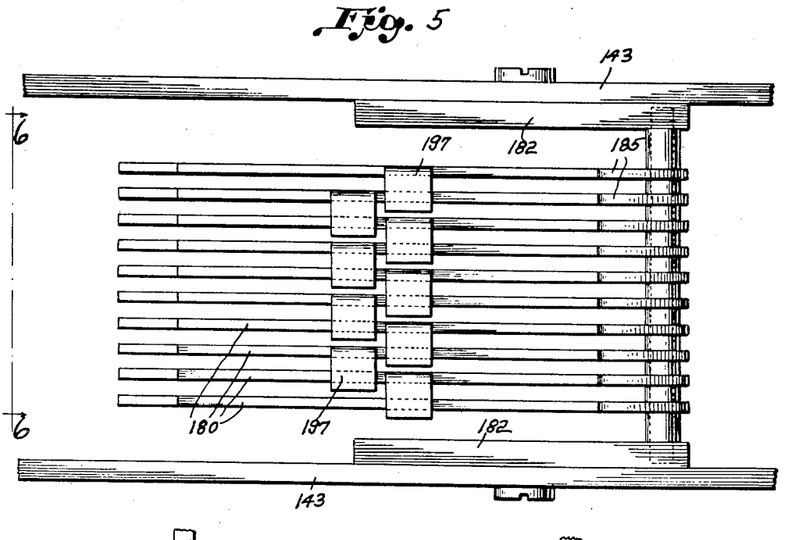
Figure 5 is a bottom plan view of levers 180 and associated parts.
Figure 6:
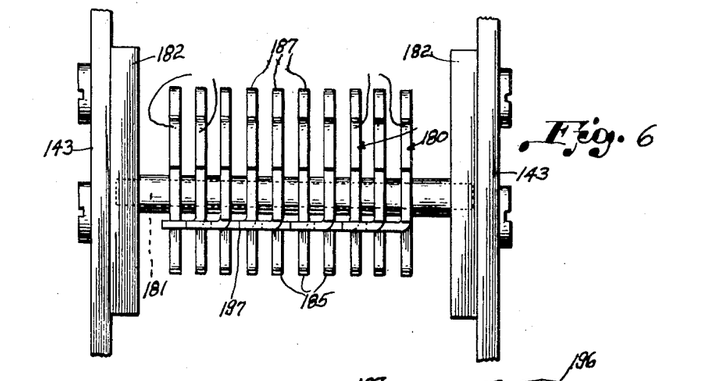
Figure 6 is an end view on the line 6—6 of Figure 5.
Figure 7:
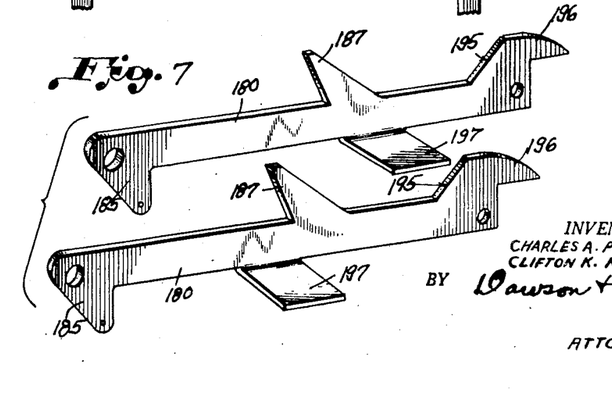
Figure 7 is a perspective view of latch fingers employed in connection with the adding type bar operation.

Particularly with reference to Figures 5, 6 and 7, it will be noted that each finger 180, except that at the extreme left hand of the bank of fingers, is provided with a laterally directed integral plate lug 197 which immediately underlies the next adjacent finger of the series in the direction to the left, as viewed with respect to Figure 6. The plate lugs 197 are staggered on their respective fingers, as shown in Figure 5, so that there will be no interference in their operation. By reason of this construction it will be apparent that when any finger of the series to the left of the right hand finger, viewed with respect to Figure 6, is depressed, it will in turn, through the chain of plate lugs on the other fingers, carry down with it all fingers to its right, so that their associated slides 142 may function by movement to their appropriate positions.

*Add type bar printing mechanism*

During forward movement of the operating frame O in the first half of its cycle, the main shaft 168 operating from the motor and clutch assembly, will have correspondingly rotated a pair of snail cams 198 affixed to the shaft for rotation therewith. The location of these cams is such that they are engaged with the forward edge portions of the hammer carrier levers 199 at their lower end portions. These hammer carrier levers 199, and the associated parts which function in the striking movement of the hammer and type bars in the printing operation, are disclosed in detail in the patent of Clifton King Rainey, No. 2,496,357 of February 7, 1950. Briefly described, this mechanism includes a pair of the hammer carrier levers 199, each of which is pivoted intermediate its ends for oscillation in a vertical plane in the printing bar mounting frame 150, best shown in Figure 8. At their upper ends the levers 199 are connected by the transversely extended hammer 44 which carries the type guide 43. The lower ends of the hammer levers are biased to move in a direction which imparts striking action to the hammer by the tension of coil spring means 200 connected between a point on the main frame and the intermediate portion of a cross bar 201 carried by and between the lower ends of the hammer levers. As the cams 198 arrive in proper position, their high points 202 slip past a shoulder 203 on the forward edge of each hammer lever and trigger the hammer levers for snap movement in a striking action under the influence of the spring means 200. This striking action of the hammer cannot take place until the adding type bars have been positioned for printing action under the influence of their respective bell crank actuators 153. One complete operating cycle of the frame O is effected simultantously with one complete revolution of the main shaft 168. In consequence, when the high point 202 of each cam returns to its initial position, as shown in Figure 4, a diammetrically opposed dwell portion of each cam is engaged with the forward edge of each hammer lever 199 in a manner to position the hammer levers as shown in Figure 4. In this position of the hammer and hammer levers, the hammer clears the platen so that normal operation of the letter keys may take place with the type bars striking through the type guide 43 without interference from the hammer.

Aligning comb

Figures 8, 11:
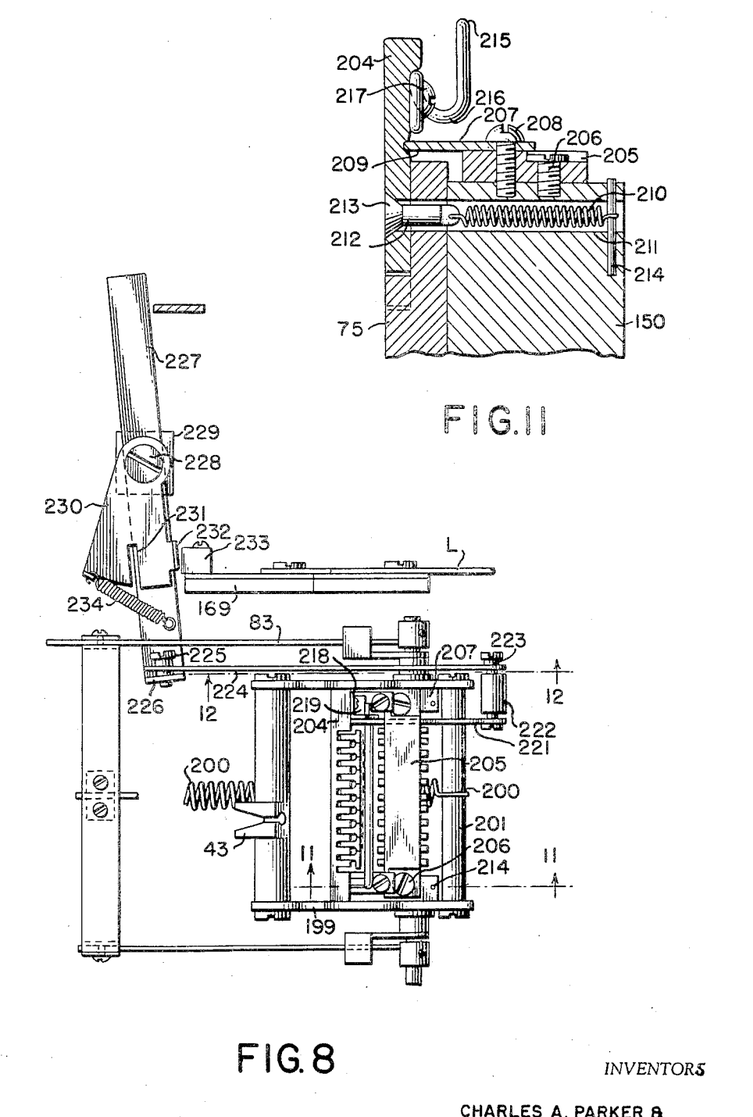
Figure 8 is a top plan view of the adding type bar mechanism.
Figure 11 is a vertical section on line 11—11 of Figure 8.
Figure 9:
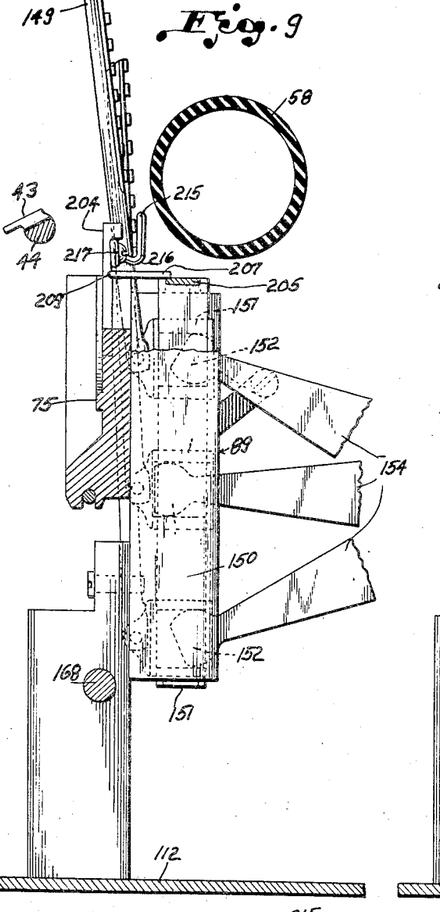
Figures 9 and 10 are vertical sections through the adding type bar lift mechanism.
Figure 10:
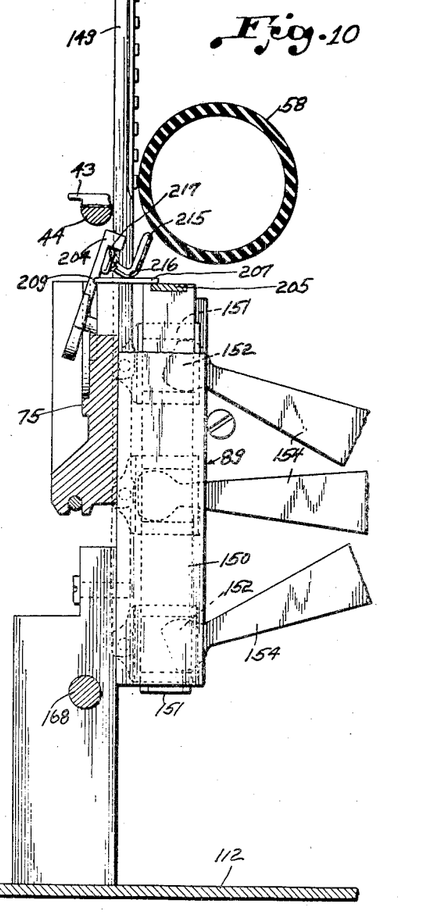
Figure 12:
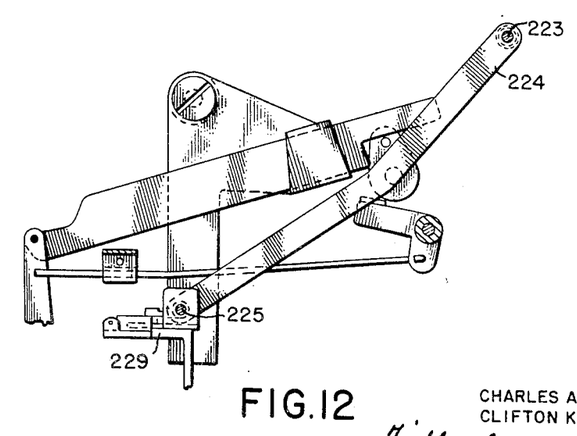
Figure 12 is a vertical section on line 12—12 of Figure 8.
Figure 13:
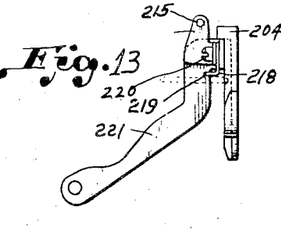
Figure 13 is a detail view of lever 221 and comb 204.

When the adding type bar actuators 153 have been operated, as described, to bring their respective type bars to the proper elevation for printing, mechanism is brought into play for moving the elevated type bars into true coplanar vertical alignment transversely of the frame so that the bars will print uniformly when they are struck by the hammer. This mechanism is best shown in Figures 8, 9 and 10. When the adding type bars 149 arrive at their proper elevated positions they are angled upwardly and forwardly, as shown in Figure 9, with their shanks leaning against the upper portion of the adding type bar comb 204. As the type bars are disposed at different elevations their angles of inclination against the comb 204 are different and, if they were struck by the hammer while in this position, the printing at the striking point would be irregular. In order to eliminate this possibility of irregular printing, the comb 204 is utilized as a means for bringing all adding type bars that are to be printed into proper coplanar alignment and printing position with respect to the platen, as shown in Figure 10. By thus positioning the type bars immediately prior to printing, the hammer 44 is caused to strike all the bars at the same instant and with the same degree of force. If the type bars remained in the position of Figure 9 it is obvious that the striking action of the hammer would not be uniform over all the bars to be printed.

The adding type bar supporting frame, generally indicated at 89, has its side pieces 150 connected at their upper ends by a rigid cross plate 205 extended transversely therebetween and secured thereto by threaded securing elements 206. This top plate 205 supports at each end a forwardly directed bearing plate 207 that is secured to the top plate by an appropriate threaded securing element 208. Each plate 207 is relatively small and is rounded at its forward edge to provide a fulcrum point 209 against which the rear face of the comb bears. The comb itself is loosely seated in the upper front edge portion of the type bar segment 75 and cooperates with the segment in providing a front plate assembly forwardly of the adding type bar mounting frame. The comb is loosely mounted with respect to the segment and, adjacent each fulcrum 209, is appropriately notched to provide for rocking on the fulcrum when the comb is shifted for positioning the type bars. In its normal position, as shown in Figures 9 and 11, the comb is disposed flatly against the segment 75 and in a vertical position through the agency of biasing means, here shown as a retracting spring 210. Each spring is disposed axially in a mounting bore 211 that extends through the upper end portion of each side bar 150 of the adding bar mounting frame. The bores 211 extend through the respective side pieces from front to rear and are open at their ends. The forward end of each bore 211 loosely receives the inner end of a shank 212 that is passed through a bore in the segment 75 and through a receiving bore in the comb 204. The head of the shank is enlarged, as at 213, and is disposed substantially in countersunk relation to the body of the comb with a loose fit. The spring 210 in each mounting bore is connected at its forward end to the inner end of the adjacent shank 212 and at its rear end to an anchor pin 214 mounted in the body of the side bar 150 and extended across the bore. The shank 212 with its head 213 in association with the spring provides a holding means loosely connected with the comb to permit movement of the comb relative to the holding means in the course of its operation. This holding means is biased to urge the comb normally in its vertical position bearing flatly against the front of the type bar segment. The rear face of the comb above the fulcrum plate 207 mounts a guard 215, which, as shown in Figures 8 and 11, comprises a stiff wire directed across the rear face of the comb in parallel spaced relation thereto to provide a clearance for receiving the adding type bars between the wire and comb. This guard wire 215 has one end directed vertically downward and rounded, as at 216, to provide a bearing portion that is adapted to seat upon and rock on the fulcrum plate 207. The terminal of the rounded portion 216 is looped and is secured by appropriate fastening means 217 to the adjacent end of the comb. At its other end the guard wire 215 is secured in a mounting bracket 218 that is secured to the adjacent end of the comb. The bracket 218 is provided with an angle piece 219 which, in location and form, substantially registers transversely of the frame with the bearing 216 at the opposite end of the guard wire. The angle piece functions in the same manner as the bearing 216.

The bracket assembly 218—219 is secured to the end of the comb by a securing element 220 that also functions as the securing means for the upper end of an arm 221 which extends rearwardly and downwardly from the rear face of the comb 204 at the left hand side of the type bar mounting frame between the adjacent side bar 150 and the left hand guide plate of the series of vertical guide plates disposed in the frame between the followers 151 of the bell crank actuators 153. The lower rear end of the arm 221 has rigidly secured thereto a laterally directed stud 222 which extends toward the left end of the type bar mounting frame and a slight distance therebeyond for pivotal connection as at 223 with a forwardly disposed link 224. The link 224 extends forwardly with respect to the frame assembly to a point beyond and forwardly of the type bar segment and hammer assembly and at its forward end has loose pivotal connection with a stud 225 mounted in a terminal bracket 226 on the end of a horizontally disposed lever 227. This lever 227 is an actuator that is pivoted intermediate its ends on a fulcrum element 228 mounted on the upper end of a bracket 229 secured to an element of the main frame. The mounting of the bracket 229 and the relationship of the parts with respect to the main frame is best shown in Figure 8. The same fulcrum element 228 that provides a pivot for the actuator lever 227 also provides pivotal mounting for a horizontally oscillatable member 230 that is super-imposed on the lever 227. The member 230 comprises a substantially triangular plate having a depending flange 231 that engages against the forward edge of the actuator lever. The plate also is provided on its rear edge with an upstanding flange 232 which is disposed vertically in the path of travel of a stud 233 carried by the head 169 of the left hand side plate L of the operating frame. Spring means 234 connects the plate member 230 with a point on the shank of the actuator lever 227 adjacent its end which has an operating connection with the link 224. The spring 234 is normally under tension sufficient to pull the plate 230 so that its depending flange 231 is held yieldingly against the forward edge of the actuator lever, as shown in Figure 8. As the operating frame moves forward toward the end of its first half cycle, the stud 233 abuts the upstanding flange 232 of the member 230 and carries it forwardly to rock the member on its pivot. This action increases tension on the spring 234 to the point at which the spring itself pulls the lever 227 to rock on its pivot and thus pull the link 224 forwardly to effect rocking movement of the comb 204 on its fulcrum point 209. As previously described, when the comb is thus rocked on its fulcrum it assumes the position shown in Figure 10 and its upper edge portion carries the elevated adding type bars rearwardly into proper coplanar position for striking against the platen.

It sometimes happens in the operation of bookkeeping machines that too great a thickness of paper is interposed between the platen and the type bars and this normally tends to jam the mechanism concerned with the rocking action of the comb, as the type bars cannot move to their true vertical position for striking. Should this happen, the forward movement of the link 221 would move the lower portion of the comb outwardly and forwardly, but due to the position of the type bars the comb would be separated from its fulcrum point 209 in a lateral and forward direction. At this point no breakage of parts could occur for the reason that the comb would then fulcrum on the type bar and would be held against slippage out of position by the engagement of the portion 216 of the guide bar and the angle member 219 against the upper surface of the fulcrum plate 207. The entire comb assembly would thus be held in its proper relationship with the rest of the mechanism although it would be permitted to give against the tension of the springs 210. In turn, this yielding play of the parts would be reflected in further tension on the spring 234; so that under any conditions of jamming the parts could not move or be forced beyond their point of movement as limited by the strength of spring 234. When the tension on the springs is released, either by a removal of the jamming cause or by a return of the operating frame-carried member 233 to its initial position, the tilted comb would be guided back to its position of engagement on the fulcrum point 209 by reason of the guiding action of the curved portion 216 of the guide wire through its engagement against the top of the fulcrum plate 207. Even though an undue thickness of paper at the printing point should result in the movement of the comb so as to separate it from its fulcrum point 209, the upper rear edge of the comb would still position the type bars in true lateral registry for uniform impact by the hammer 44 when it is brought to striking position.

It is to be understood that the present disclosure is illustrative and not restrictive, and that the invention may be practiced in any form consistent with its scope as claimed.

We claim:

1. In an accounting machine, a platen, calculating mechanism including adding type printing elements movable into and out of printing position relative to the platen, said printing elements being disposed in different angular relations when raised into different printing positions, a unitary support for said type printing elements when moved to printing position, said type printing elements loosely engaging the support at different angles of inclination, a cycling operating member for the calculating mechanism, said support being movable relative to the platen to bring its engaged type printing elements which have been raised into printing position into coplanar alignment parallel to the platen, and means operative from said operating member at a predetermined point in its cycle to move said support for coplanar alignment of the type printing elements.

2. In an accounting machine, a platen to support record material at a printing line, a group of movable type element differentially positionable relative the platen for printing and having pivots movable toward and from said printing line in a plane extending parallel to and at least closely adjacent said printing line, hammer means for impacting said type elements against the record material on the platen at said printing line, means for guiding the type elements in varying angular displacement from said plane during differential positioning movement thereof, and means for aligning said type elements in said plane prior to impacting operation of said hammer.

3. In a machine of the character specified, a platen to support record material at a printing line, a printing hammer, means to impart to said hammer a percussive stroke in a path toward said platen from a position substantially spaced from said platen, a plurality of elongated type bars, type bar indexing devices each having a pivotal connection with a respective one of said type bars remote from the path of said hammer and individually movable toward and from said path in a plane parallel to and extending closely adjacent said printing line to differentially index said type bars through the path of said hammer and relative to said printing line, means to guide said type bars at points substantially spaced from said hammer path toward said pivotal connections and substantially spaced from said plane in the direction away from said platen whereby differently indexed type bars are differently spaced from said hammer in said hammer path and differently spaced from said platen, and means to move said type bars into position of alignment in said plane at equal distances from said hammer for simultaneous striking by said hammer as the latter reaches a predetermined position in said stroke.

4. In a machine of the character specified, a platen to support record material at a printing line, a printing hammer, means to impart to said hammer a percussive stroke in a path toward said platen from a position substantially spaced from said platen, a plurality of elongated type bars each having a series of types extending longitudinally thereof, type bar indexing devices each having a pivotal connection with a respective one of said type bars remote from the path of said hammer and individually movable toward and from said path in a plane parallel to and extending closely adjacent said printing line to differentially index said type bars through the path of said hammer to position selected types at said printing line, means to guide said type bars at points substantially spaced from said hammer path toward said pivotal connections and substantially spaced from said plane in the direction away from said platen whereby differently indexed type bars are differently spaced from said hammer in said hammer path and said selected types are differently spaced from said platen, and means to shift said guide means to move said type bars into positions of alignment in said plane at equal distances from said hammer for simultaneous striking by said hammer as the latter reaches a predetermined position in said stroke and with the selected types substantially in contact with said record material at said printing line.

5. In a machine of the character specified, a platen to support record material at a printing line, a printing hammer, means to impart to said hammer a percussive stroke in a path toward said platen from a position substantially spaced from said platen, a plurality of elongated type bars, type bar indexing devices each having a pivotal connection with a respective one of said type bars remote from the path of said hammer and individually movable toward and from said path in a plane parallel to and extending closely adjacent said printing line to differentially index said type bars through the path of said hammer and relative to said printing line, a guide device rockable on an axis substantially parallel to and spaced from said printing line and having guiding contact with said type bars at points substantially spaced from said hammer path toward said pivotal connections and substantially spaced from said plane in the direction away from said platen whereby differently indexed type bars are differently spaced from said hammer in said hammer path and differently spaced from said platen, and means to rock said guide device on said axis to move said type bars into positions of alignment in said plane at equal distances from said hammer for simultaneous striking by said hammer as the latter reaches a predetermined position in said stroke.

6. In a machine of the character specified, a cyclically operable operating means, a platen to support record material at a printing line, a printing hammer, means actuated by said operating means in a machine cycle to drive said hammer in a percussive stroke in a path toward said platen from a position substantially spaced from said platen, a plurality of elongated type bars each having a series of types extending longitudinally thereof, type bar indexing devices each having a pivotal connection with a respective one of said type bars remote from the path of said hammer and individually movable toward and from said path in a plane parallel to and extending closely adjacent said printing line to differentially index said type bars through the path of said hammer to position selected types at said printing line, means actuated by said operating means to move said indexing devices to index said type bars prior to said stroke of said hammer, means to guide said type bars at points substantially spaced from said hammer path toward said pivotal connections and substantially spaced from said plane in the direction away from said platen whereby differently indexed type bars are differently spaced from said hammer in said hammer path and said selected types are differently spaced from said platen, and means actuated by said operating means to shift said guide means after said indexing of said type bars and prior to said stroke of said hammer to move said type bars into positions of alignment in said plane at equal distances from said hammer for simultaneous striking by said hammer as the latter reaches a predetermined position in said stroke.

References Cited in the file of this patent

UNITED STATES PATENTS

| | | |
|---|---|---|
| 918,529 | Gardner | Apr. 20, 1909 |
| 1,240,256 | Quentell | Sept. 18, 1917 |
| 1,317,604 | Thieme | Sept. 30, 1919 |
| 1,508,532 | Quentell | Sept. 16, 1924 |
| 1,685,685 | Smith | Sept. 25, 1928 |
| 2,100,213 | Garbell | Nov. 23, 1937 |
| 2,183,829 | Arnold | Dec. 19, 1939 |
| 2,307,669 | Crosman | Jan. 5, 1943 |
| 2,496,357 | Rainey | Feb. 7, 1950 |